United States Patent
Castañeda et al.

(10) Patent No.: US 11,782,269 B2
(45) Date of Patent: *Oct. 10, 2023

(54) EYEWEAR USE DETECTION

(71) Applicant: Snap Inc., Santa Monica, CA (US)

(72) Inventors: Julio Cesar Castañeda, Redondo Beach, CA (US); Rajeev Ramanath, Torrence, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,314

(22) Filed: Jan. 18, 2023

(65) Prior Publication Data

US 2023/0152579 A1 May 18, 2023

Related U.S. Application Data

(63) Continuation of application No. 17/475,090, filed on Sep. 14, 2021, now Pat. No. 11,579,443, which is a continuation of application No. 16/215,785, filed on Dec. 11, 2018, now Pat. No. 11,163,155.

(60) Provisional application No. 62/611,111, filed on Dec. 28, 2017.

(51) Int. Cl.
| | |
|---|---|
| *G02B 27/00* | (2006.01) |
| *G02B 27/01* | (2006.01) |
| *G06F 1/3231* | (2019.01) |
| *G06F 1/3206* | (2019.01) |
| *G06F 1/3203* | (2019.01) |
| *G06F 1/16* | (2006.01) |
| *G06F 21/32* | (2013.01) |

(52) U.S. Cl.
CPC ..... *G02B 27/0093* (2013.01); *G02B 27/0176* (2013.01); *G06F 1/3231* (2013.01); *G02B 2027/0163* (2013.01); *G02B 2027/0169* (2013.01); *G02B 2027/0178* (2013.01); *G06F 1/163* (2013.01); *G06F 1/3203* (2013.01); *G06F 1/3206* (2013.01); *G06F 21/32* (2013.01)

(58) Field of Classification Search
CPC ...... G06F 1/3206; G06F 1/3203; G06F 1/163; G06F 1/3231; G06F 21/32; G02B 27/0093; G02B 27/0176; G02B 2027/0163; G02B 2027/0169; G02B 2027/0178
USPC ........................... 713/320, 323; 361/679.03
See application file for complete search history.

(56) References Cited

U.S. PATENT DOCUMENTS

| | | | |
|---|---|---|---|
| 10,310,296 | B2 | 6/2019 | Howell et al. |
| 11,137,620 | B2 * | 10/2021 | Castañeda .............. H05K 1/189 |
| 11,163,155 | B1 | 11/2021 | Castañeda et al. |
| 11,579,443 | B2 | 2/2023 | Castañeda et al. |
| 2007/0109491 | A1 | 5/2007 | Howell et al. |
| 2011/0080289 | A1 | 4/2011 | Minton |
| 2012/0056847 | A1 | 3/2012 | Milford et al. |

(Continued)

*Primary Examiner* — Ji H Bae
(74) *Attorney, Agent, or Firm* — Culhane Meadows PLLC; Stephen J. Weed

(57) ABSTRACT

Eyewear including a support structure defining a region for receiving a head of a user. The support structure supports optical elements, electronic components, and a use detector. The use detector is coupled to the electronic components and is positioned to identify when the head of the user is within the region defined by the support structure. The electronic components monitor the use detector and transition from a first mode of operation to a second mode of operation when the use detector senses the head of the user in the region.

20 Claims, 17 Drawing Sheets

(56) References Cited

U.S. PATENT DOCUMENTS

| | | |
|---|---|---|
| 2012/0242570 A1 | 9/2012 | Kobayashi |
| 2013/0154906 A1 | 6/2013 | Braun et al. |
| 2015/0015458 A1 | 1/2015 | Cho et al. |
| 2016/0025971 A1 | 1/2016 | Crow et al. |
| 2016/0131913 A1 | 5/2016 | Kim et al. |
| 2016/0223821 A1 | 8/2016 | Seo |
| 2016/0254681 A1 | 9/2016 | Choi et al. |
| 2017/0068119 A1 | 3/2017 | Antaki et al. |
| 2017/0078788 A1 | 3/2017 | Lopez et al. |
| 2017/0090588 A1 | 3/2017 | Wakae |
| 2017/0094816 A1 | 3/2017 | Yun et al. |
| 2017/0160394 A1 | 6/2017 | Johnson et al. |
| 2018/0317846 A1 | 11/2018 | Moyerman et al. |
| 2019/0265508 A1 | 8/2019 | Castañeda et al. |
| 2020/0268236 A1 | 8/2020 | Chiba et al. |
| 2021/0382322 A1* | 12/2021 | Castañeda ................ G02C 5/02 |

\* cited by examiner

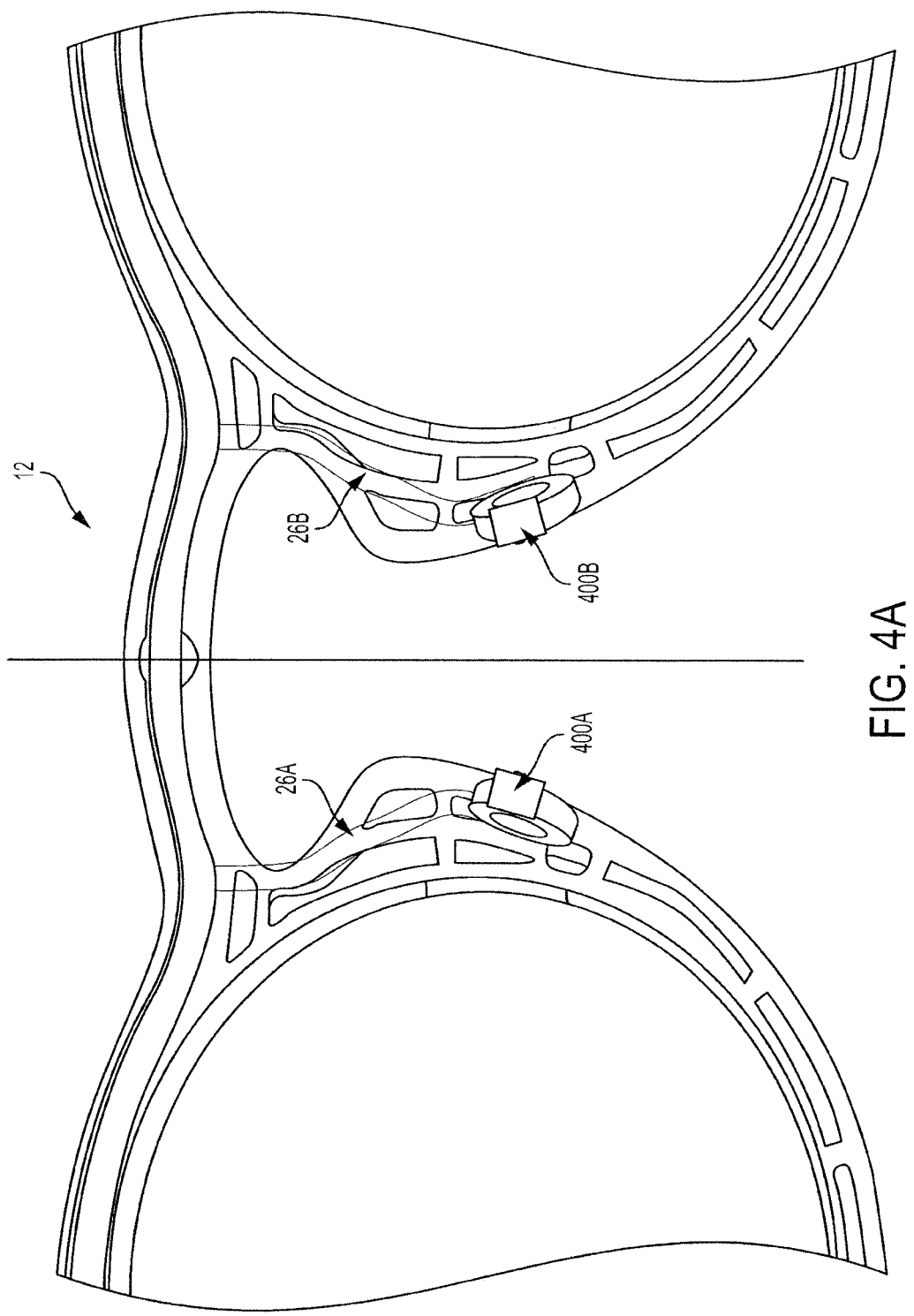

EYEWEAR USE DETECTION

CROSS-REFERENCE TO RELATED APPLICATIONS

This application is a Continuation of U.S. application Ser. No. 17/475,090 filed on Sep. 14, 2021, which is a Continuation of U.S. application Ser. No. 16/215,785 filed Dec. 11, 2018, now U.S. Pat. No. 11,163,155, which claims priority under 35 U.S.C. § 119(e) to U.S. Provisional Patent Application No. 62/611,111, filed Dec. 28, 2017, all of which are incorporated herein by reference in their entireties.

TECHNICAL FIELD

The subject matter disclosed herein generally relates to detecting when eyewear is being worn by a user and controlling eyewear functionality based on the detection.

BACKGROUND

Many portable devices designed to be worn by a user utilize electronic components to perform various functions. The electronic components are typically powered by a battery. As the electronic components consume power, charge on the battery quickly diminishes. Thus, the user must frequently recharge the battery in order to continue using the portable device.

BRIEF DESCRIPTION OF THE FIGURES

FIG. 4A is another close-up partial view of the eyewear in FIG. 1C depicting a flexible printed circuit board routed to resistive probes in the nose pads.

DETAILED DESCRIPTION

Figure 1A:
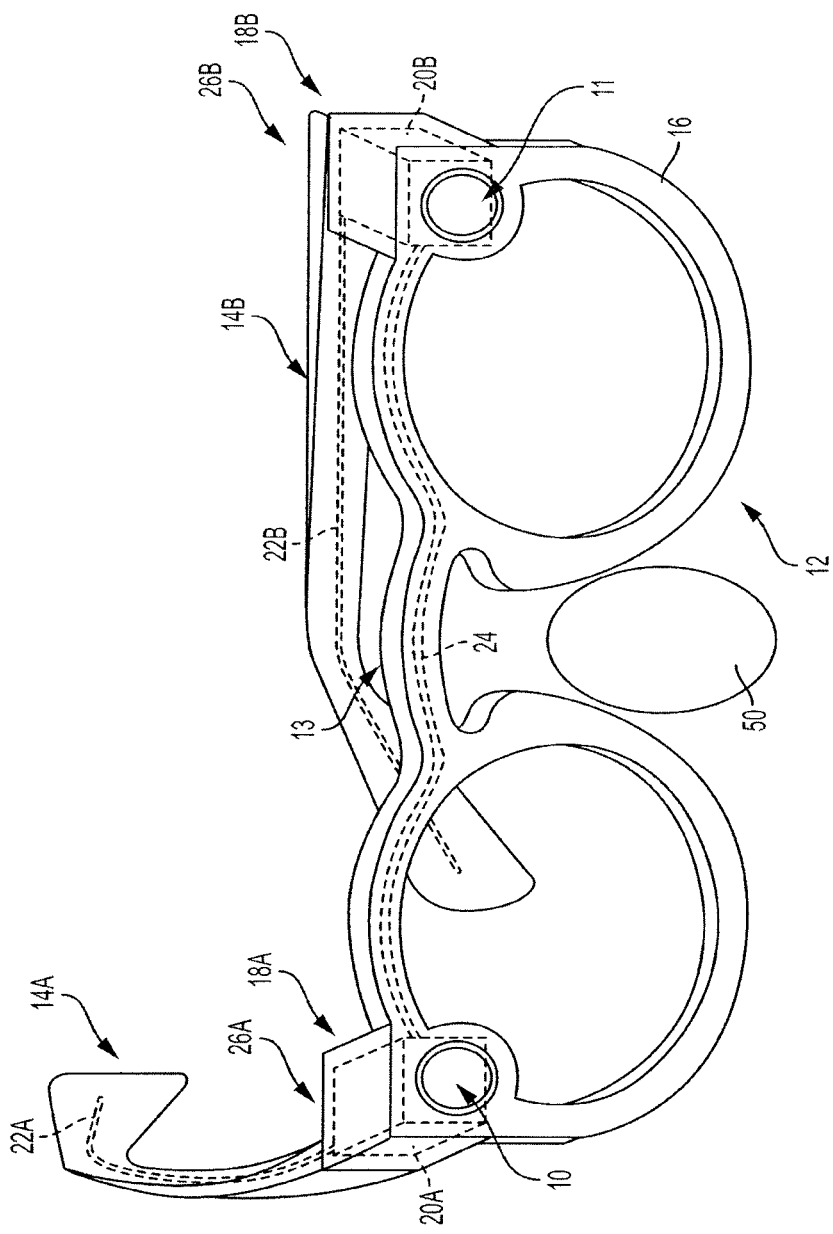
FIG. 1A is a perspective view of an eyewear example including electronic components and a support structure supporting the electronic components, the support structure defining a region for receiving a portion of a head of a user.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

The orientations of the eyewear, associated components and any devices incorporating a use detector such as shown in any of the drawings, are given by way of example only, for illustration and discussion purposes. In operation the eyewear may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation.

In an example, the eyewear includes an optical element, electronic components having a first mode of operation and a second mode of operation, a support structure configured to support the optical element and the electronic components, the support structure defining a region for receiving a head of a user, and a use detector electrically connected to the electronic components and supported by the support structure, the use detector attached to the support structure and positioned to monitor when the head of the user is within the region. The electronic components monitor the use detector and transition from the first mode of operation to the second mode of operation when the use detector senses the head of the user within the region.

The electronic components may have a relatively low power consumption level when in the first mode of operation (e.g., a low power mode) and may have a higher power consumption level when in the second mode of operation (e.g., a normal mode of operation). By detecting when the eyewear is currently being worn, the electronic components of the eyewear are able to automatically transition between modes, thereby providing the ability to conserve energy and extend battery life. The electronic components may have a third mode of operation (e.g., an off or sleep mode of operation) in which the electronic components consume even less power than the first mode of operation. As used herein, the term "eyewear" refers to any smart optical device having a support structure that is worn by a user including but not limited to smart glasses, smart goggles, and display screens.

FIG. 1A depicts a front perspective view of example eyewear 12. The illustrated eyewear 12 includes a support structure 13 that has temples 14A and 14B and a frame 16. Eyewear 12 additionally includes articulated joints 18A and 18B, electronic components 20A and 20B, and core wires 22A, 22B and 24.

Support structure 13 is configured to support one or more optical elements within a field of view of a user when worn by the user. For example, frame 16 is configured to support the one or more optical elements. As used herein, the term "optical elements" refers to lenses, transparent pieces of glass or plastic, projectors, screens, displays and other devices for presenting visual images or through which visual images may be perceived by a user. In an embodiment, respective temples 14A and 14B connect to frame 16 at respective articulated joints 18A and 18B. The illustrated temples 14A and 14B are elongate members having core wires 22A and 22B extending longitudinally therein.

Temple 14A is illustrated in a wearable condition and temple 14B is illustrated in the collapsed condition in FIG. 1A. As shown in FIG. 1A, articulated joint 18A connects temple 14A to a right end portion 26A of frame 16. Similarly, articulated joint 18B connects temple 14B to a left end portion 26B of frame 16. The right end portion 26A of frame 16 includes a housing that carries the electronic components 20A therein, and left end portion 26B also includes a housing that carries electronic components 20B therein.

Core wire 22A is embedded within a plastics material or other material that includes an outer cap of temple 14A and extends longitudinally from adjacent articulated joint 18A toward a second longitudinal end of temple 14A. Similarly, core wire 22B is embedded within a plastics material or other material that includes an outer cap of temple 14B and extends longitudinally from adjacent articulated joint 18B toward a second longitudinal end of temple 14B. Core wire 24 extends from the right end portion (terminating adjacent electronic components 20A) to left end portion 26B (terminating adjacent electronic components 20B).

Electronic components 20A and 20B are carried by support structure 13 (e.g., by either or both of temple(s) 14A, 14B and/or frame 16). Electronic components 20A and 20B include a power source, power and communication related circuitry, communication devices, display devices, a computer, a memory, modules, and/or the like (not shown). Electronic components 20A and 20B may also include a camera/microphone 10 for capturing images and/or videos, and indicator LEDs 11 indicating the operational state of eyewear 12.

In one example, temples 14A and 14B and frame 16 are constructed of a plastics material, cellulosic plastic (e.g., cellulosic acetate), an eco-plastic material, a thermoplastic material, or the like in addition to core wires 22A, 22B and 24 embedded therein. Core wires 22A, 22B and 24 provide structural integrity to support structure 13 (i.e., temple(s) 14A, 14B and/or frame 16). Additionally, core wires 22A, 22B and/or 24 act as a heat sink to transfer heat generated by electronic components 20A and 20B away therefrom so as to reduce the likelihood of localized heating adjacent electronic components 20A and 20B. As such, core wires 22A, 22B and/or 24 are thermally coupled to the heat source to provide a heat sink for the heat source. Core wires 22A and 22B and/or 24 are constructed of a relatively flexible conductive metal or metal alloy material such as one or more of an aluminum, an alloy of aluminum, alloys of nickel-silver, and a stainless steel, for example.

Figure 1B:
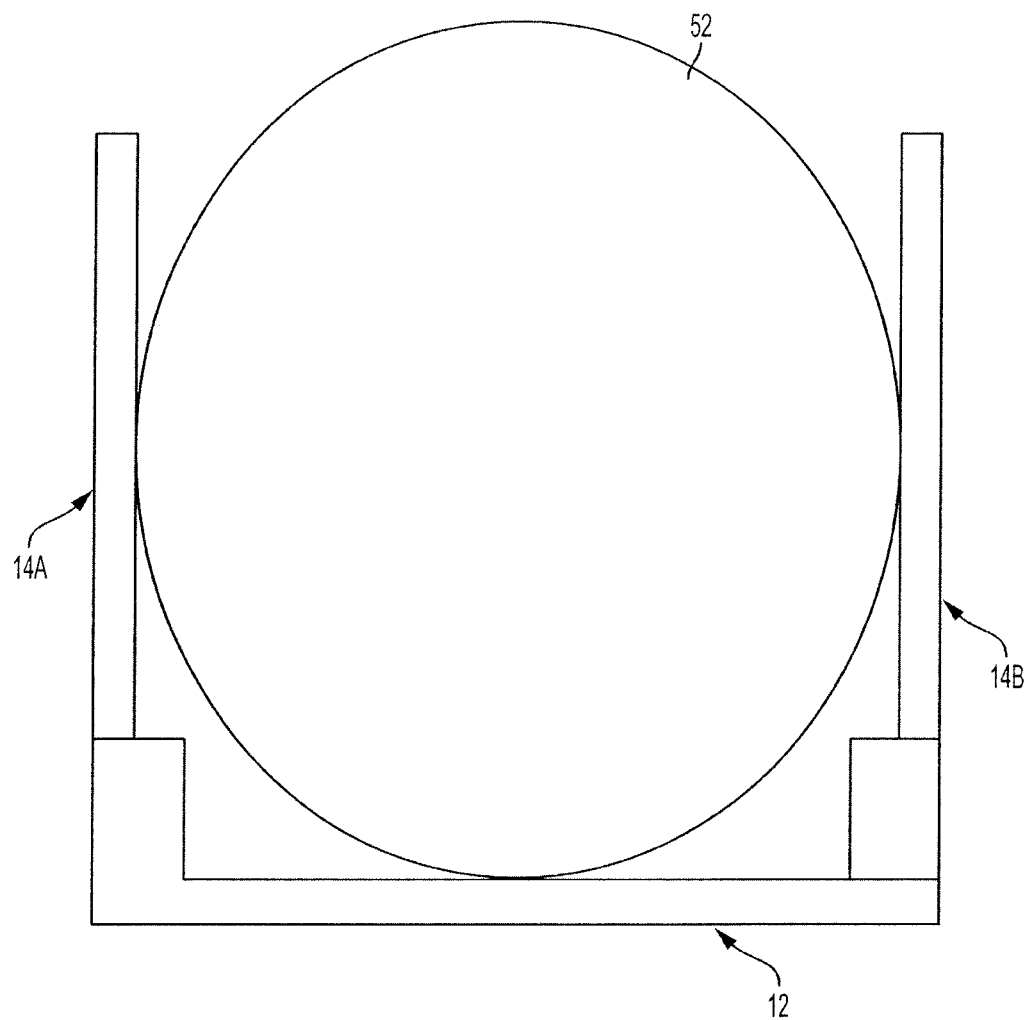
FIG. 1B is a top view of the eyewear of FIG. 1A illustrating another region defined by the eyewear for receiving at least a portion of the head of the user wearing the eyewear.

The support structure 13 defines a region 50 that receives at least a portion of the head of the user (e.g., the nose) when the eyewear 12 is worn. As illustrated in FIG. 1B, the support structure 13 may define other regions (e.g., region 52 defined by the frame 12 and temples 14A and 14B) for receiving other portion (e.g., the main portion) of the head of the user. The defined region(s) are one or more regions containing at least a portion of the head of a user that are encompassed by, surrounded by, adjacent, and/or near the support structure when the user is wearing the eyewear 12.

Figure 1C:
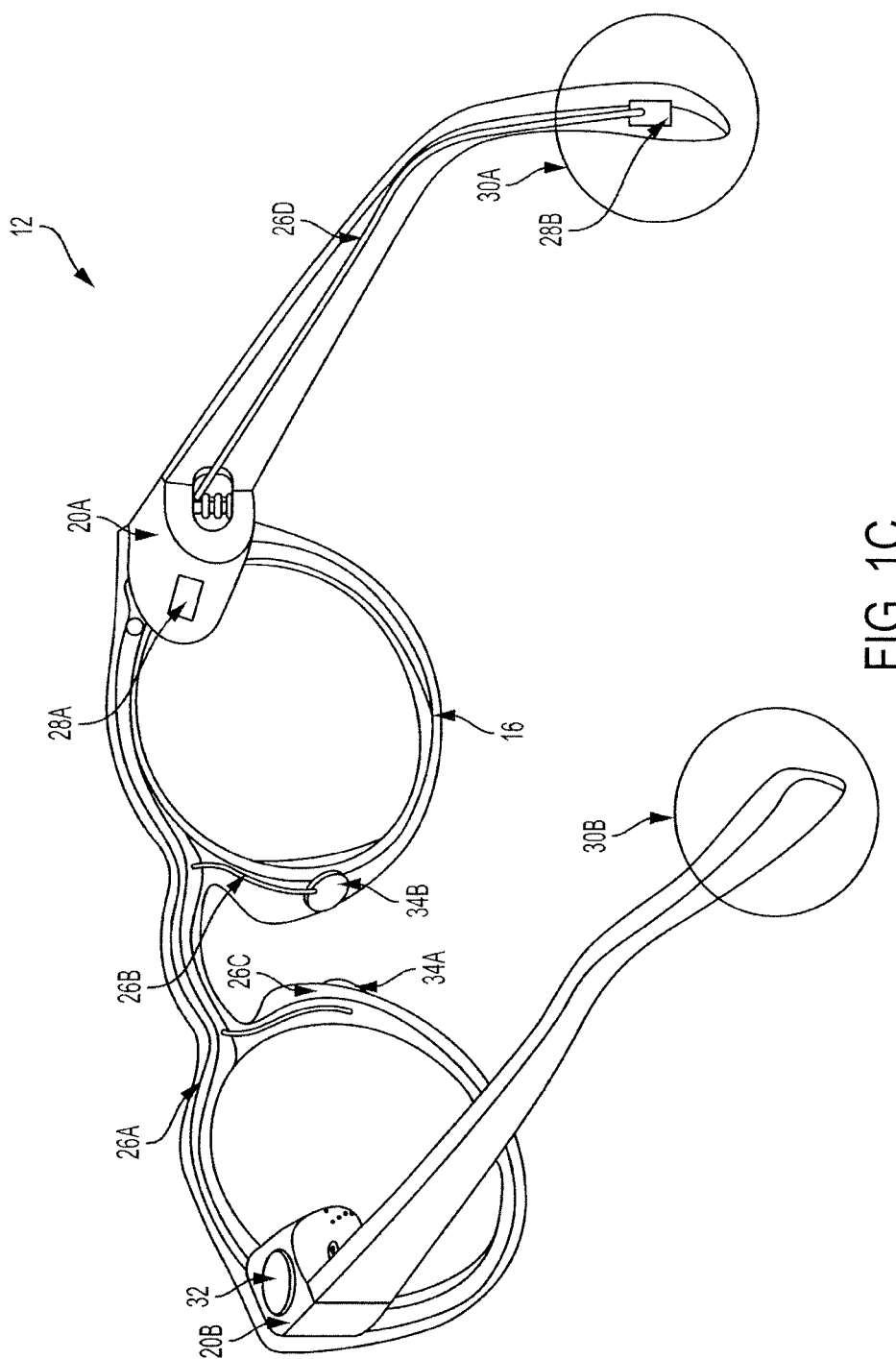
FIG. 1C is another perspective view of the eyewear in FIG. 1A.

FIG. 1C depicts another perspective view of eyewear 12 with a transparent frame 16 for illustration purposes. Eyewear 12 includes onboard electronics 20A and 20B (e.g. camera, microphone, LEDs, wireless transceiver, etc.). In addition, eyewear 12 includes sensors installed at one or more locations throughout frame 16 and/or temples 14A and 14B. For example, sensors may be installed in at least one of nose pads 34A and 34B, the housing of electronics 20A (see sensor 28A), temple areas 30A and 30B (see sensor 28B), etc. These sensors may include probes with electrodes, proximity sensors or the like, and may be coupled to electronics 20A and 20B, e.g., through one or more flexible printed circuit boards (FPCBs).

FPCBs, as shown in FIG. 1C, are routed through various portions of frame 16 and temples 14A and 14B to electrically connect these electronics 20A and 20B to the sensors. For example, as shown in FIG. 1C, FPCB 26A (primary FPCB) is routed through frame 16 to electrically connect electronics 20A and 20B together. Other FPCBs (secondary FPCB) may also be routed through the frame and temples. For example, secondary FPCBs 26B and 26C extend from main FPCB 26A to sensors (e.g. probes) embedded into nose pads 34A and 34B. In another example, FPCB 26D extends from electronics 20A to sensor 28B (e.g., a probe) embedded into temple area 30A. Although not shown, another FPCB extends from electronics 20B to a sensor embedded into temple area 30B. The use of secondary FPCBs allow other electronic devices (e.g. sensors and the like) to be embedded at various locations throughout the structure of eyewear 12. The sensors are positioned to provide a way for detecting when eyewear 12 is being worn by a user.

FPCBs 26A, 26B, 26C and 26D include one or more electrical traces for routing electrical signals between the electronic components and the sensors. These FPCBs may be embedded in the frame and temples of eyewear 12 during the manufacturing process.

For example, during a first shot of a two-shot molding process, plastic is injected into a mold to form the front half of frame 16 and/or temple 14A. After forming the front halves, the FPCBs, along with any electronic components are inserted and positioned within the mold at locations with respect to the front halves. During a second shot of the two-shot molding process, more plastic is injected into the mold to cover the components and form the back half of frame 16 or temple 14A such that the FPCBs and electronics are embedded between the front and back halves of frame 16 and/or temple 14A. After the frame and both temples are formed using the molding process, they are mechanically connected together (e.g. with screws) to form the finished eyewear 12.

As described above, embedding sensors into frame 16 and/or temples 14A and 14B allow eyewear 12 to detect when they are being worn (e.g. positioned on a user's head). Various types of sensors can be used and positioned in various locations on frame 16 and/or temples 14A and 14B to accomplish this feature. Further details of embodiments of various sensor types/placement and the control of the eyewear based on these sensors are described below.

Electronic components 20A and 20B, along with sensors (e.g. resistive probes, capacitive probes and/or proximity sensors) are supported by the support structure 13, e.g., are embedded into frame 16 and/or temples 14A and 14B of eyewear 12. These electronic components and sensors are connected using FPCBs.

Figure 1D:
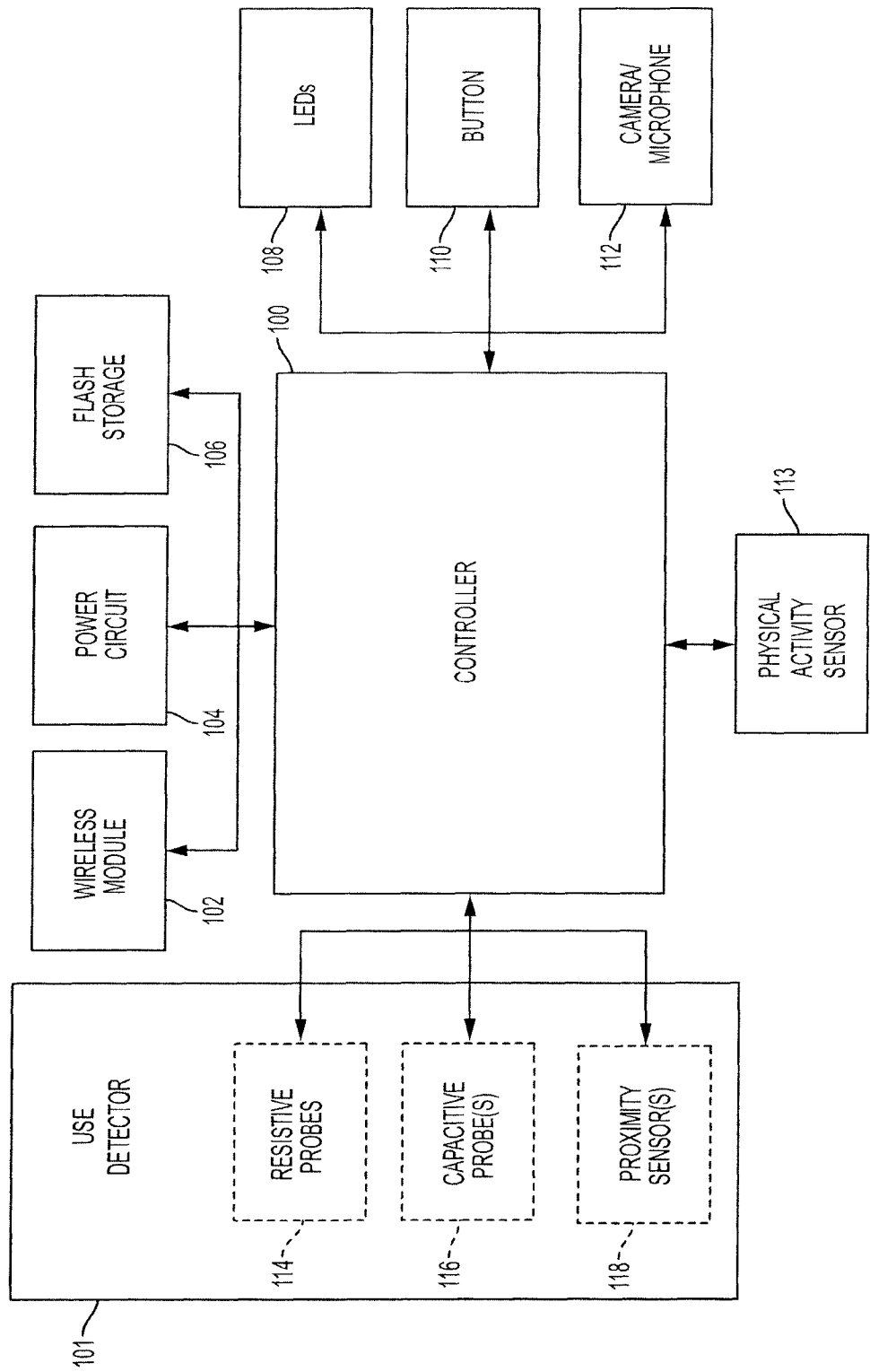
FIG. 1D is a block diagram of an example of the electronic components supported by the eyewear of FIG. 1A.

FIG. 1D is a block diagram of example electronic components 20A and 20B. The illustrated electronic components 20A and 20B include controller 100 (e.g. lower power processor, image processor, etc.) for controlling the various devices in eyewear 12, wireless module (e.g. Bluetooth™) 102 for facilitating communication between eyewear 12 and a client device (e.g. Smartphone), power circuit 104 (e.g. battery, filter, etc.) for powering eyewear 12, flash storage 106 for storing data (e.g. images, video, image processing software, etc.), LEDs 108 (e.g. colored LEDs) for providing information to the user, button 110 (e.g. momentary push button) for triggering eyewear 12 to capture images/video, camera/microphone 112 for capturing images/video and sound, and a physical activity sensor 113 (e.g., accelerometer sensing movement, button such as button 110 pressed by user, switch incorporated into a hinge to detect when a respective temple is moved from a collapsed condition to a wearable condition, etc.).

Wireless module 102 may connect with a client device such as a smartphone, tablet, phablet, laptop computer, desktop computer, networked appliance, access point device, or any other such device capable of connecting with wireless module 102. These connections may be implemented, for example, using any combination of Bluetooth, Bluetooth LE, Wi-Fi, Wi-Fi direct, a cellular modem, and a near field communication system, as well as multiple instances of any of these systems. Communication may include transferring software updates, images, videos, sound between eyewear 12 and the client device (e.g. images captured by eyewear 12 may be uploaded to a smartphone).

Camera/microphone 112 for capturing the images/video may include digital camera elements such as a charge coupled device, a lens, or any other light capturing elements that may be used to capture image data. Camera/microphone 112 includes a microphone having a transducer for converting sound into an electrical signal.

Button 110 may be a physical button that, when depressed, sends a user input signal to controller 100. A depression of button 110 for a predetermined period of time (e.g., three seconds) may be processed by controller 100 as a request to turn on eyewear 12 (e.g., transition eyewear 12 from an off or sleep mode of operation to a low power mode of operation).

Controller 100 is a controller that controls the electronic components. For example, controller 100 includes circuitry to receive signals from camera 112 and process those signals into a format suitable for storage in memory 106. Controller 100 is structured such that it may be powered on and booted to operate in a normal operational mode, or to enter a sleep mode. Depending on various power design elements controller 100 may still consume a small amount of power even when it is in an off state and/or a sleep state. This power will, however, be negligible compared to the power used by controller 100 when it is in an on state and will also have a negligible impact on battery life.

In one example embodiment, controller 100 includes a microprocessor integrated circuit (IC) customized for processing sensor data from camera 112, along with volatile memory used by the microprocessor to operate. The memory may store software code for execution by controller 100. For example, the software code may instruct controller 100 to control the mode of operation of the electronic components.

Each of the electronic components require power to operate. As described above, power circuit 104 that may include a battery (not shown), power converter and distribution circuitry (not shown). The battery may be a rechargeable battery such as lithium-ion or the like. Power converter and distribution circuitry may include electrical components for filtering and/or converting voltages for powering the various electronic components.

LEDs 108, among other uses, may be used as indicators on eyewear 12 to indicate a number of functions. For example, LEDs 108 may illuminate each time the user presses button 110 to indicate that eyewear 12 is recording images and/or video and/or sound. These LEDs may be located at location 20B as shown in FIG. 1A.

In addition to the electronic components described above, controller 100 also couples to use detector 101. Use detector 101 includes one or more sensors such as resistive probes 114, capacitive probe(s) 116 and/or proximity sensors 118 connected to controller 100 for monitoring the region and sensing when a user's head is within the region. These sensors receive signals from and transmit signals to controller 100 indicating whether eyewear 12 is being worn by the user.

Sensors 114, 116 and/or 118 may be placed at locations on support structure 13 for sensing at least a portion of the head of the user (e.g., the user's head or features thereof). Controller 100 of the eyewear 12 may automatically control the operational mode of eyewear 12 using information obtained from the sensors. For example, eyewear 12 may use these sensors to detect whether or not eyewear 12 is being worn by the user. If the sensors sense the presence of an object (e.g., the user's head or features thereof), the output of the sensor indicates that the eyewear 12 is being worn. The eyewear 12 then enters or maintains a normal operational mode. If the sensors do not sense the presence of an object (e.g., the user's head or features thereof), the sensor output indicates the eyewear 12 is not being worn. The eyewear 12 then enters or maintains a low power mode (e.g., a sleep mode) in order to conserve battery power.

Figure 2:
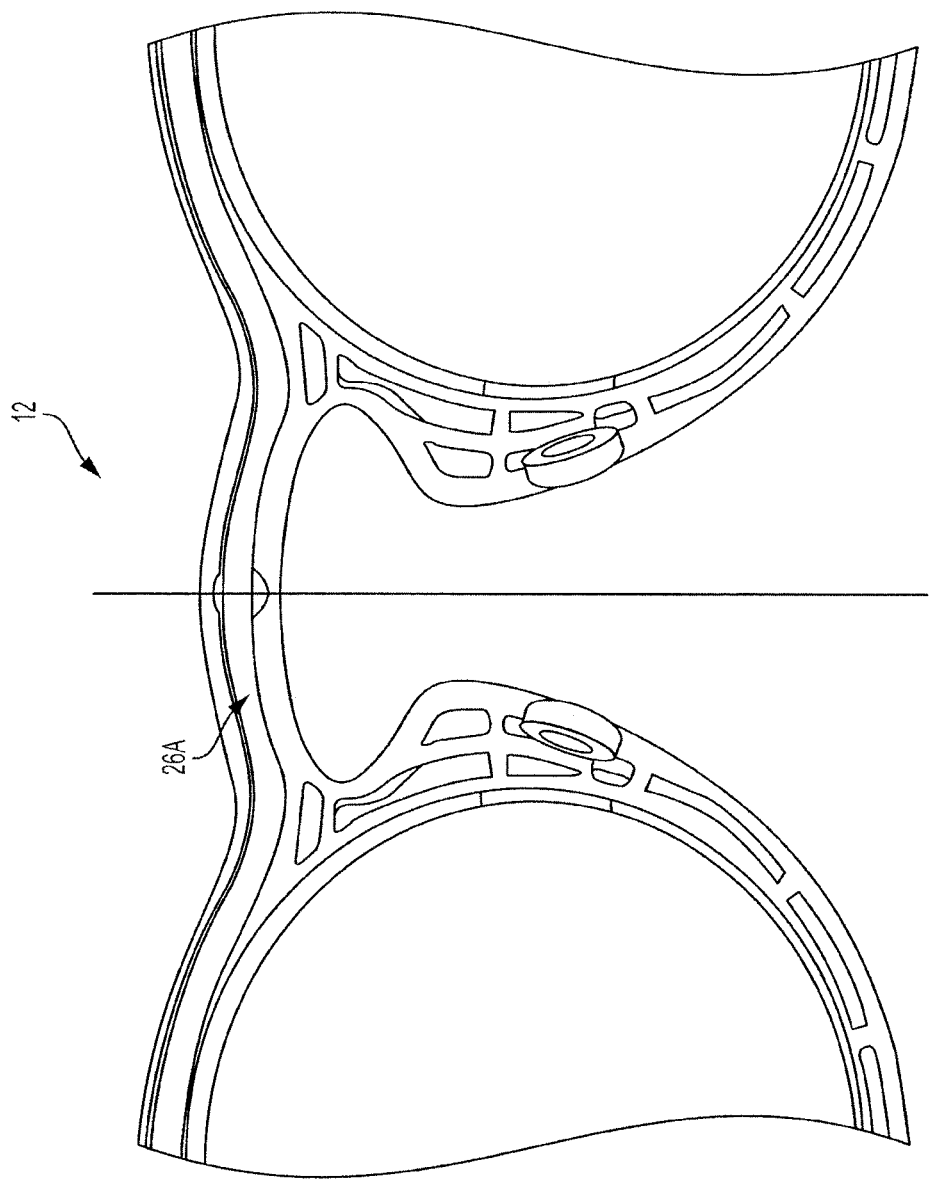
FIG. 2 is a close-up partial view of the frame of the eyewear in FIG. 1C depicting a flexible printed circuit board routed through the frame.

FIG. 2 is a close-up perspective view of eyewear 12 in FIG. 1C showing an FPCB 26A routed through the frame. This FPCB 26A is the primary FPCB in eyewear 12, and electrically connects electronics 20A with electronics 20B. Secondary FPCBs (not shown) may be used to position sensors such as sensors 114, 116, and/or 118 at various locations in support structure 13 of eyewear 12.

Figure 3A:
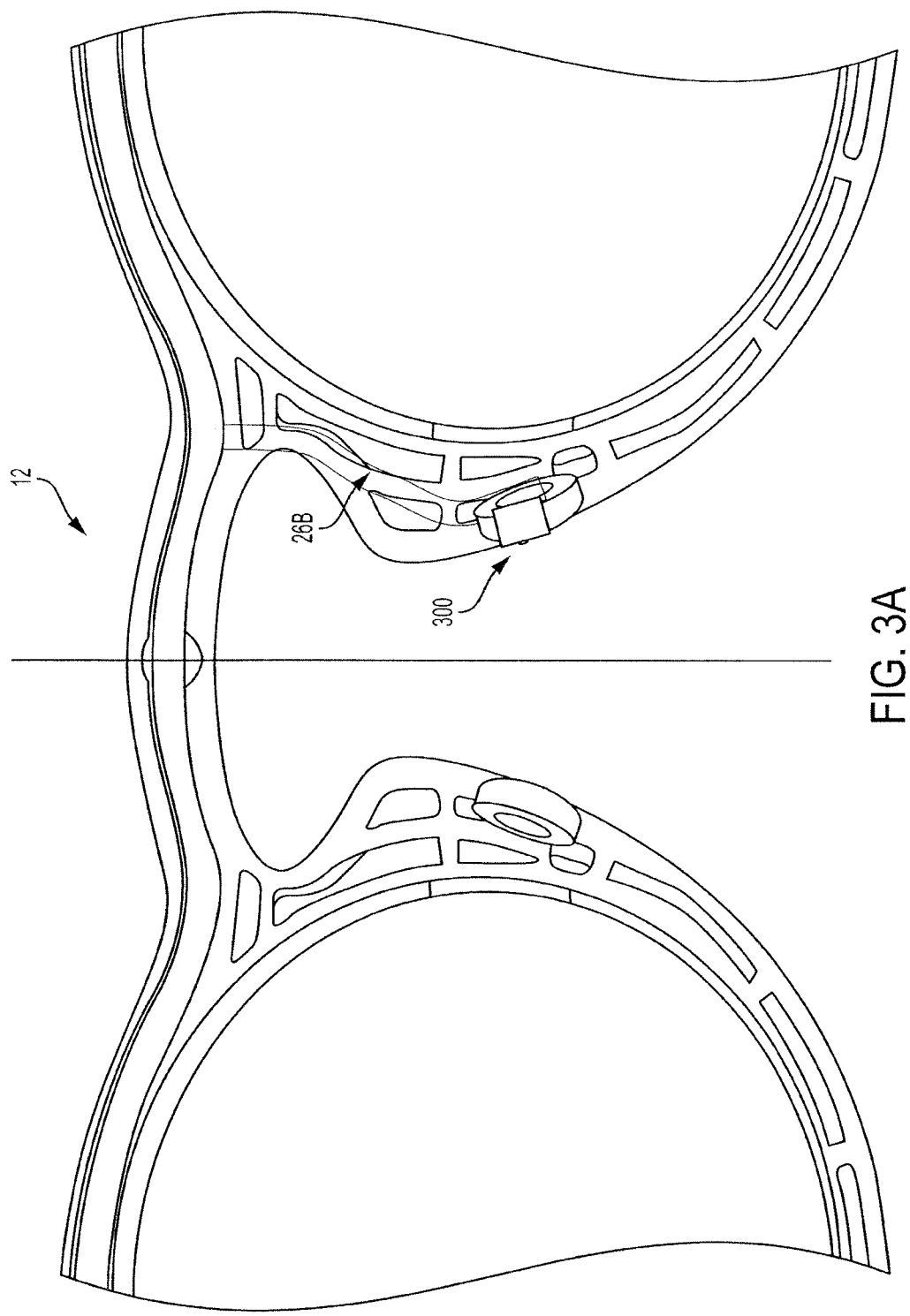
FIG. 3A is another close-up partial view of the eyewear in FIG. 1C depicting a flexible printed circuit board routed to a capacitive probe in a nose pad.

For example, sensors 114, 116 and/or 118 may be embedded in one or more nose pads of eyewear 12 to sense the user's nose when eyewear 12 is being worn. FIG. 3A depicts a close-up partial view of eyewear 12 in FIG. 1C, where secondary FPCB 26B extends from main FPCB 26A and is routed to sensor 300 located in one of the nose pads. In one example, sensor 300 may be a capacitive probe 116 that changes its capacitance when near or in contact with the nose of the user. The capacitance of sensor 300 affects characteristics (e.g., frequency) of an electrical signal (e.g., oscillating signal) applied to capacitive electrodes (not shown). For example, primary FPCB 26A and secondary FPCB 26B may pass an electrical signal under control of controller 100 from electronics 20A to sensor 300. Controller 100 analyzes this electrical signal to determine whether eyewear 12 is being worn.

To reduce power consumption when attempting to detect the user's nose, control electronics 20A (e.g., controller 100) may periodically send (e.g., every 3 seconds) an oscillating electrical signal to the capacitance probe via the FPCBs rather than continuously applying a signal. Electronic components 20A then monitor the frequency of this signal. When the user is not wearing eyewear 12, capacitance sensor 300 has a capacitance value (C1) that electronic components 20A interpret as eyewear 12 that is not being worn by the user. When the user is wearing eyewear 12, the user's nose enters the region defined by the support structure and contacts an electrode (not shown) of capacitance sensor 300. Due to this interaction, the capacitance of capacitance sensor increases to C2, which affects the frequency of the oscillating electrical signal applied thereto. The electronic components 20A interpret this change in frequency as eyewear 12 that is being worn by the user.

Determining when the user is wearing or not wearing eyewear 12 is beneficial for various applications. One such application is power conservation. For example, the determination may be used to control the operational state of eyewear 12 to conserve battery power when the eyewear is not being worn. In accordance with this example, when electronic components 20A (e.g., via sensors 114, 116 and/or 118 and controller 100) detect that the user is wearing eyewear 12, the operational state is set to a normal mode of operation. When electronic components 20A (e.g., via sensors 114, 116 and/or 118 and controller 100) detect that the user is not wearing eyewear 12, however, the operational state is set to a lower power mode (e.g., sleep mode) where battery power is conserved.

Figure 3B:
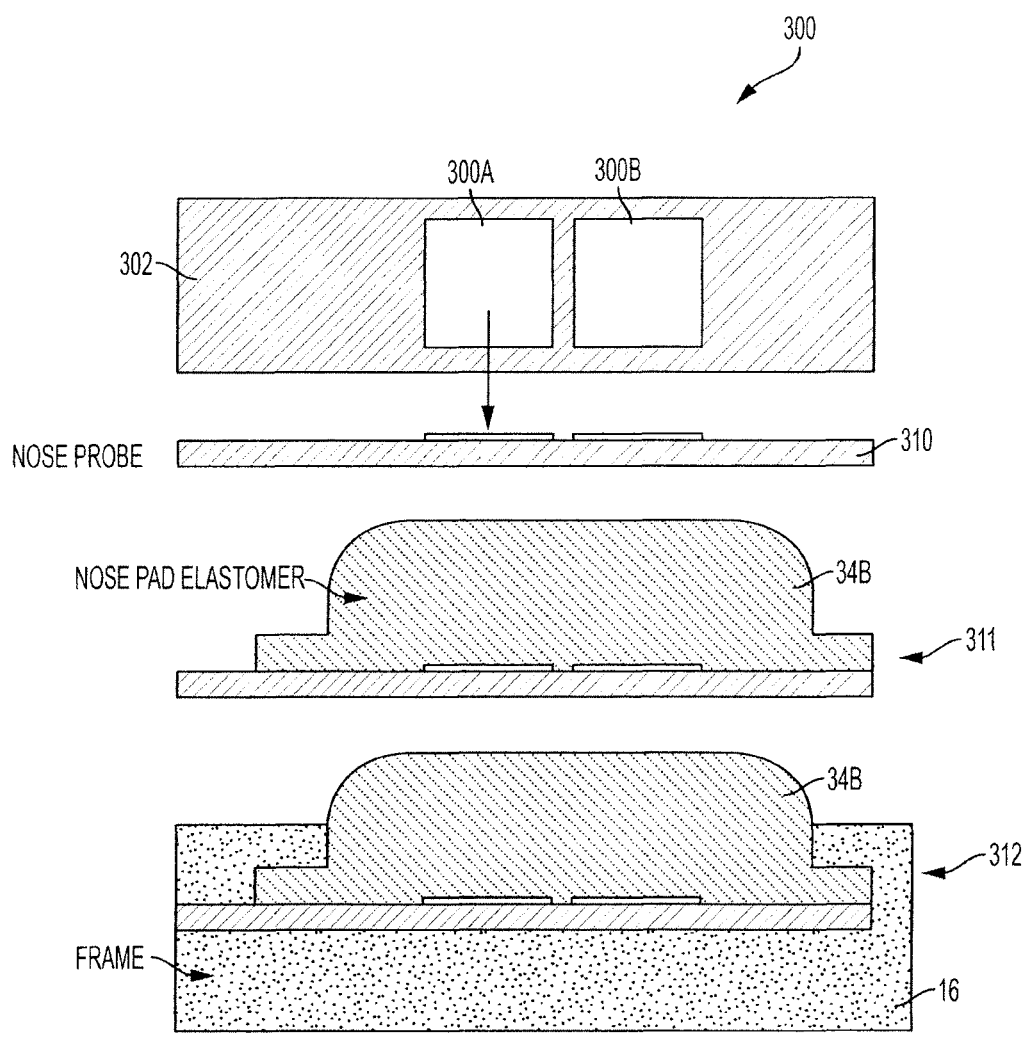
FIG. 3B is series of illustrations depicting an example of steps for manufacturing the eyewear depicted in FIG. 3A.

FIG. 3B depicts a series of illustrations depicting steps for manufacturing capacitive nose probe 300 (e.g., capacitive sensor 300 in FIG. 3A). In a first step 310, capacitive electrodes 300A and 300B are mounted (e.g., soldered, adhered, etc.) onto a portion of FPCB 302. In a second step 311, the capacitive nose probe is covered with a nose pad 34B (e.g., elastomer). In a third step 312, a molding process (e.g., two-shot molding process) embeds nose probe 300 and nose pad 34B into frame 16.

Although FIGS. 3A and 3B show embedding of a capacitive probe (e.g., capacitive probe 116) into frame 16, other sensors may be used. For example, FIG. 4A depicts a close-up view of eyewear 12 in FIG. 1C with resistive sensors (e.g., resistive probes 114) in the nose pads. In FIG. 4A, secondary FPCBs 26B and 26C both extend from primary FPCB 26A to resistive sensors 400A and 400B (e.g., resistive probes 114) located within the nose pads.

In this example, resistive sensors 400A and 400B sense the resistance through the user's nose when eyewear 12 is being worn. For example, during operation, control electronics 20A (e.g., controller 100) may periodically apply (e.g., every 3 seconds) an electrical signal, via the FPCBs, to resistive electrodes 400A and 400B and a sensing resistor (not shown) wired in series with the electrodes. Electronics 20A (e.g., controller 100) then monitors the voltage between resistive electrodes 400A and 400B or across the sensing resistor. For example, when the user is not wearing eyewear 12, the voltage between resistive electrodes 400A and 400B is an open circuit voltage (V1) and the voltage across the sensing resistor is 0 v which is interpreted by electronics 20A (e.g., controller 100) to indicate that eyewear 12 is not being worn by the user. When the user is wearing eyewear 12, the user's nose comes into contact with resistive electrodes 400A and 400B thereby completing the circuit and allowing current to flow. As a small amount of unperceivable current flows through the user's nose, the voltage divides across resistive electrodes 400A and 400B and the sensing resistor. Electronic components 20A (e.g., controller 100) interpret this change in voltage between resistive electrodes 400A and 400B and across the sensing resistor as eyewear 12 that is being worn by the user.

Figure 4B:
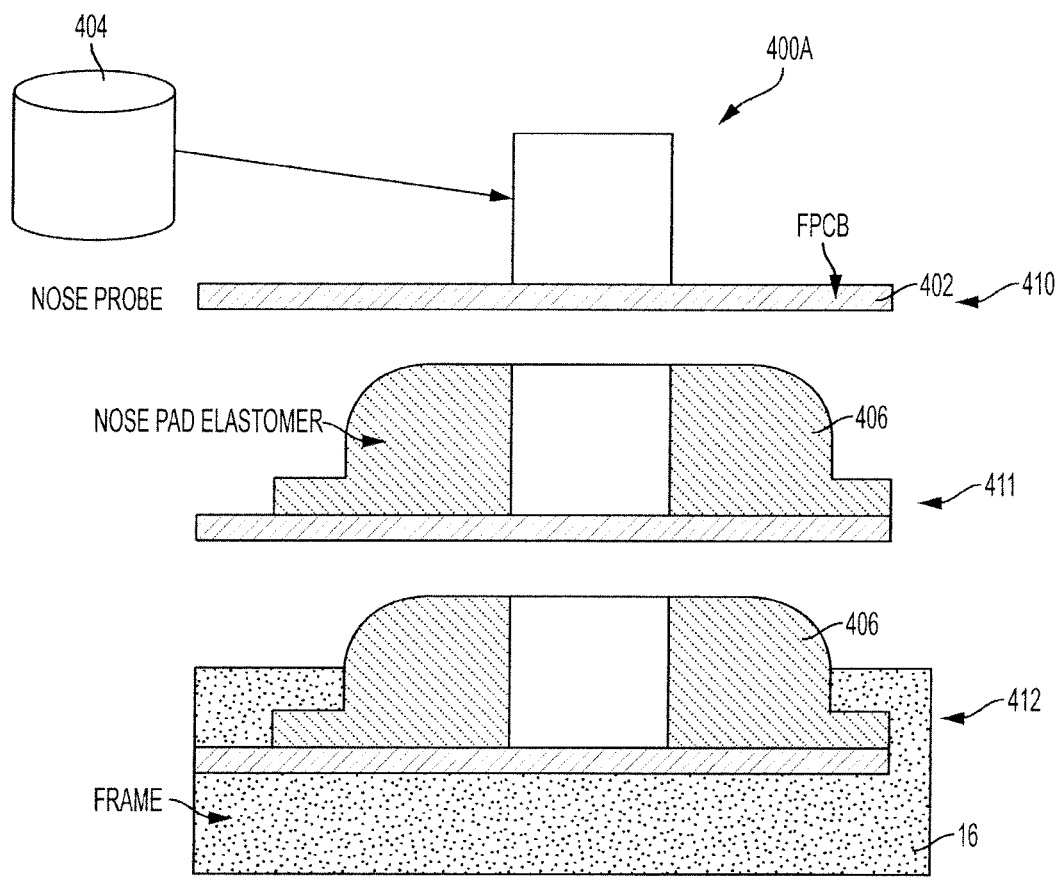
FIG. 4B is a series of illustrations depicting an example of steps for manufacturing the eyewear with the resistive probes in FIG. 4A.

FIG. 4B is a series of illustrations depicting example steps for manufacturing resistive nose probes (e.g., 400A; FIG. 4A). In a first step 410, nose probe electrode 404 is mounted (e.g., soldered, adhered, etc.) onto a portion of FPCB 402. In a second step 411, nose probe electrode 404 is partially covered with a nose pad 406 (e.g., elastomer). A portion of nose probe electrode 404, however, is still exposed which allows for contact with the user's nose. In a third step 412, nose probe electrode and the nose pad are embedded into frame 16 during the molding (e.g., two-shot molding) process.

In another embodiment, a proximity sensor may be used to sense if eyewear 12 is being worn by the user. For example, proximity sensor 500 shown in FIG. 4B is an infrared (IR) transceiver that includes an IR transmitter 504, IR receiver 502 and electrical terminals 506/508. Proximity sensor 500 emits an IR signal from IR transmitter 504, senses a reflection of the transmitted IR signal and generates a signal that is responsive to whether a reflection is received (i.e., whether an object such as the user is present). If no object is present in front of IR transmitter 504, then no reflection is received by IR receiver 502. If an object is present, however, IR receiver 502 receives a reflection and generates a signal indicating that the user is present.

Figure 5A:
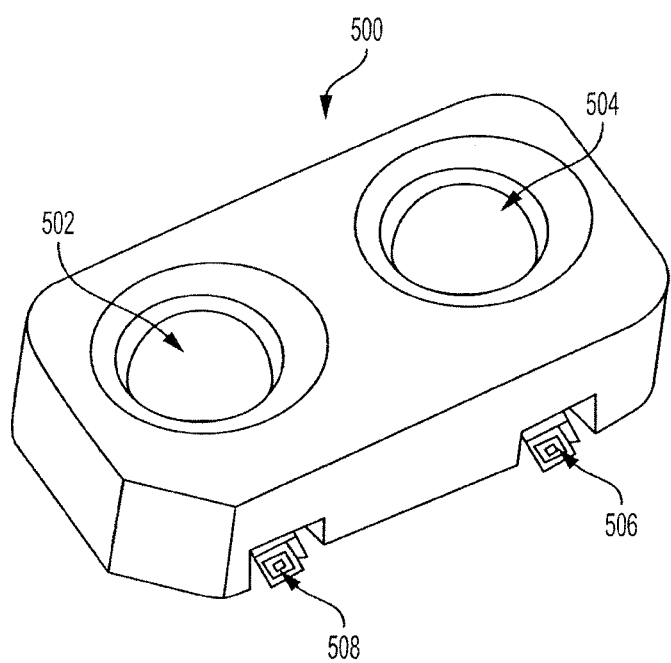
FIG. 5A is a perspective view of a known proximity sensor.
Figure 5B:
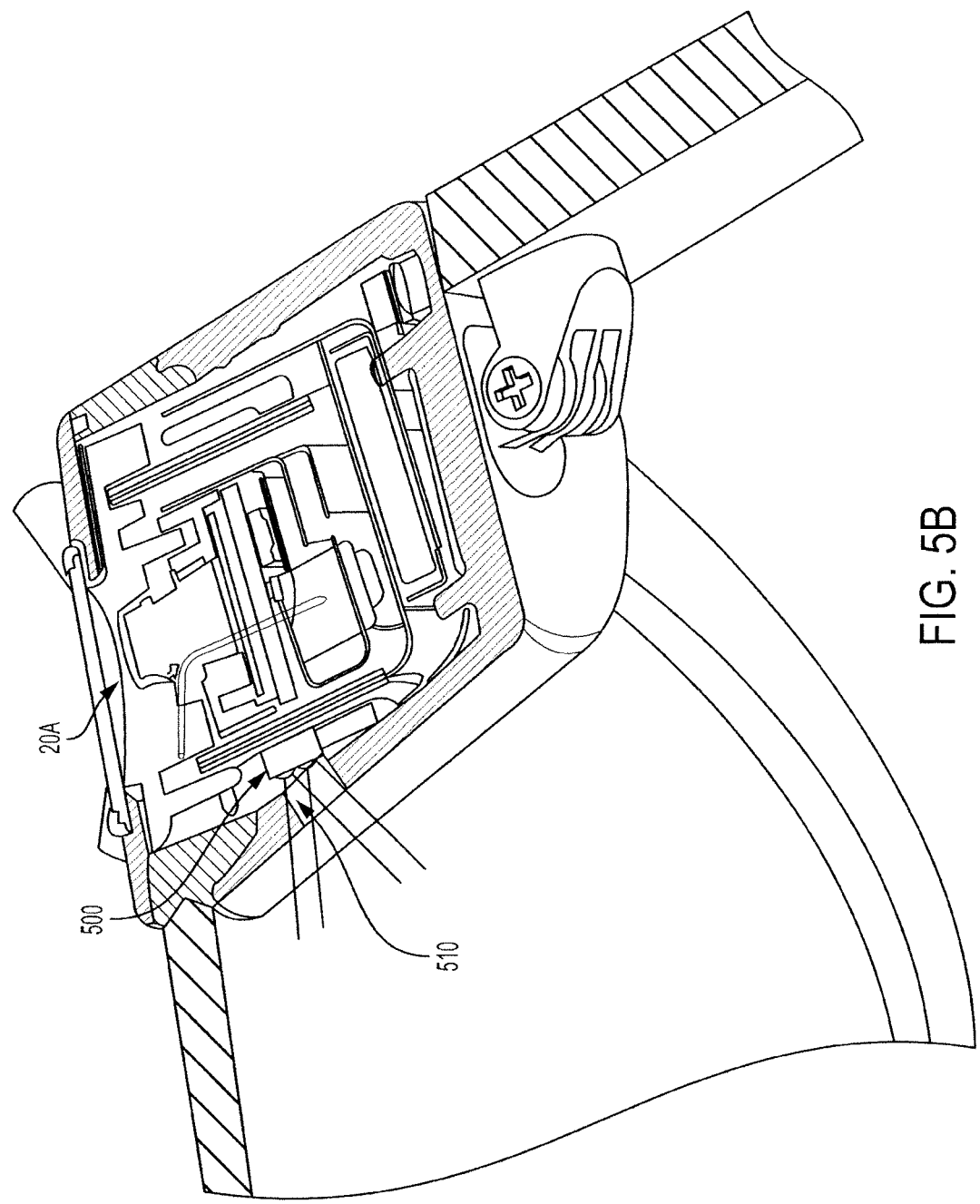
FIG. 5B is an illustration of the proximity sensor in FIG. 5A installed on a frame of example eyewear.

Proximity sensor 500 in FIG. 5A may be positioned at various locations on frame 16 or temples 14A and 14B for sensing the presence of the user's head. For example, FIG. 5B depicts a view of proximity sensor 500 embedded into frame 16 at a location where electronic components 20A are housed. In this example, proximity sensor 500 is mounted to, and electrically connected to a PCB within electronic components 20A. Proximity sensor 500 is positioned to direct the IR transmitter/receiver towards where the user's head would be located when the eyewear is worn. The housing of electronic components 20A may also include an opening or a transparent section 510 that allows the IR light from proximity sensor 500 to enter and exit the housing.

During operation, electronic components 20A control the IR transmitter of proximity sensor 500 to periodically emit an IR signal. When the user is not wearing eyewear 12, the IR signal is not reflected back to proximity sensor 500 which therefore does not produce an output electrical signal. Control electronics 20A interprets the lack of the output electrical signal as an indication (e.g., logic 0) that the user is not wearing eyewear 12. When the user is wearing eyewear 12, however, the IR signal is reflected off of the user's head and received by the IR receiver of proximity sensor 500. This action changes the conductivity of IR receiver (e.g., photo resistor) to produce an output electrical signal from proximity sensor 500. Control electronics 20A receives this output electrical signal and interprets it as an indication (e.g., logic 1) that the user is wearing eyewear 12.

Figure 5C:
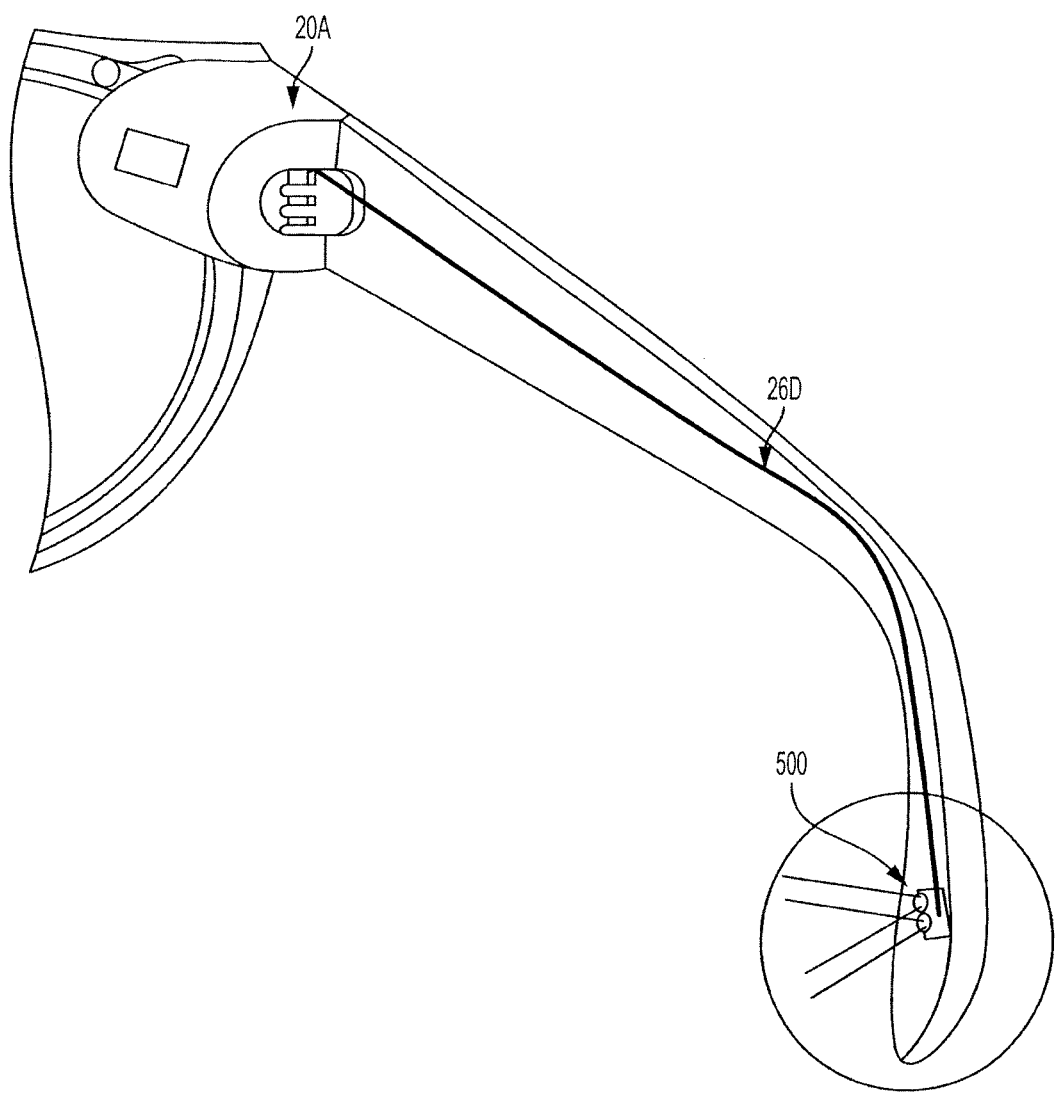
FIG. 5C is another illustration of the proximity sensor in FIG. 5A installed on a temple of example eyewear.

Although FIG. 5B depicts proximity sensor 500 embedded into frame 16 with electronic components 20A, other installation locations are possible. In one example (not shown), proximity sensor 500 may be embedded in the nose pad of eyewear 12 similar to the capacitive probe shown in FIG. 3A. In this example, proximity sensor 500 senses the presence of absence of the user's nose to indicate whether eyewear 12 is being worn or not. In yet another example, shown in FIG. 5C, proximity sensor 500 is embedded in the temple of eyewear 12. FPCB 26D extends from electronic components 20A to proximity sensor 500 located on a portion of temple 14A. Although FIG. 5C depicts proximity sensor 500 mounted to the end of temple 14A, it is also possible to mount proximity sensor 500 to any portion along temple 14A or on temple 14B not shown, as long as proximity sensor 500 is aimed in a direction to sense the user's head when eyewear 12 is worn.

The various connections between controller 100 and the other electronic components including the sensors shown in FIG. 1D are accomplished through wires, PCBs and FPCBs. These electrical connections are routed through various portions of frame 16 and/or temples 14A and 14B during the manufacturing (e.g., two-shot molding) process. Once eyewear 12 is manufactured, these electrical connections are fully embedded in the eyewear and may or may not be visible to the user based on the opacity of the manufacturing material.

The overall structure and operation of eyewear 12 has been described above. Further details regarding the operation of eyewear 12 will now be described with respect to various flowcharts.

Figure 6A:
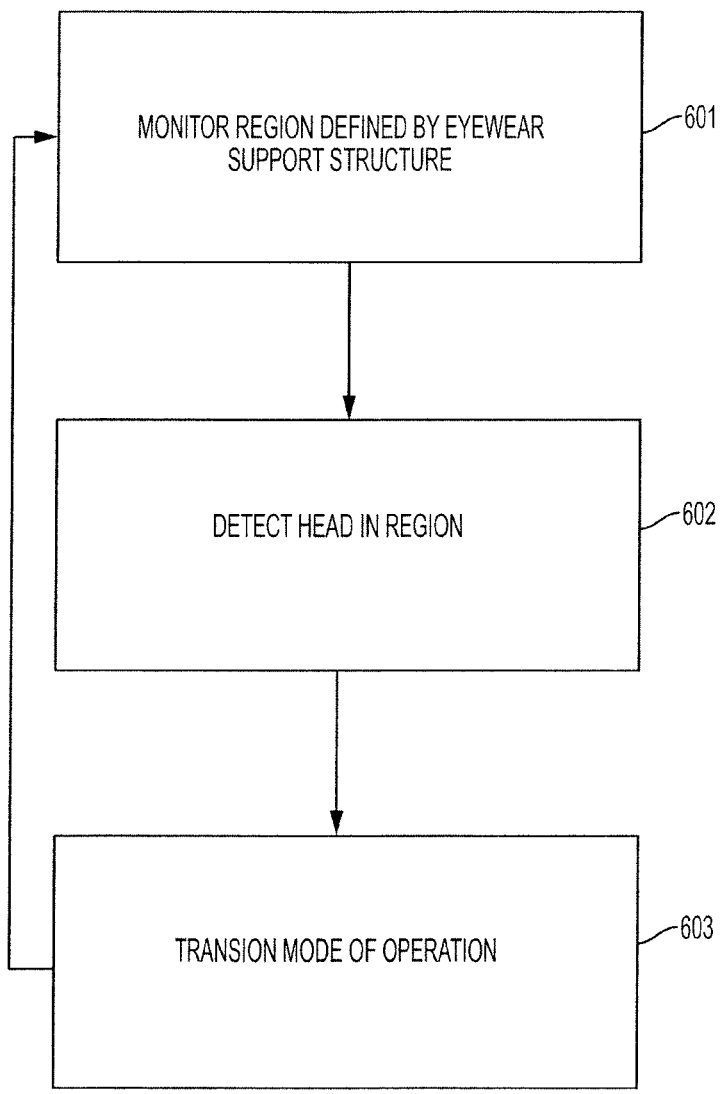
FIG. 6A is a flowchart showing an example of operation of the eyewear.

In a first example, FIG. 6A depicts a flow chart of the operation of eyewear such as eyewear 12 (FIG. 1) in which electronic components transition between modes of operation when at least a portion of a head of a user is within a region defined by a support structure of the eyewear. At step 601, the region is monitored. Use detector 101 may monitor the defined region with a sensor positioned on the support structure. At step 602, at least a portion of a head of a user is detected in the region defined by the support structure of the eyewear. Controller 100 may detect when the at least the portion of the head is sensed within the region based on output from the use detector 101. At step 603, the eyewear transitions from a first mode of operation to a second mode of operation when the at least the portion of the head of the user is detected within the region. Controller 100 may transition electronic components of eyewear 12 to the second mode of operation when the user's head is detected. The process may be repeated (e.g., every three seconds).

Figure 6B:
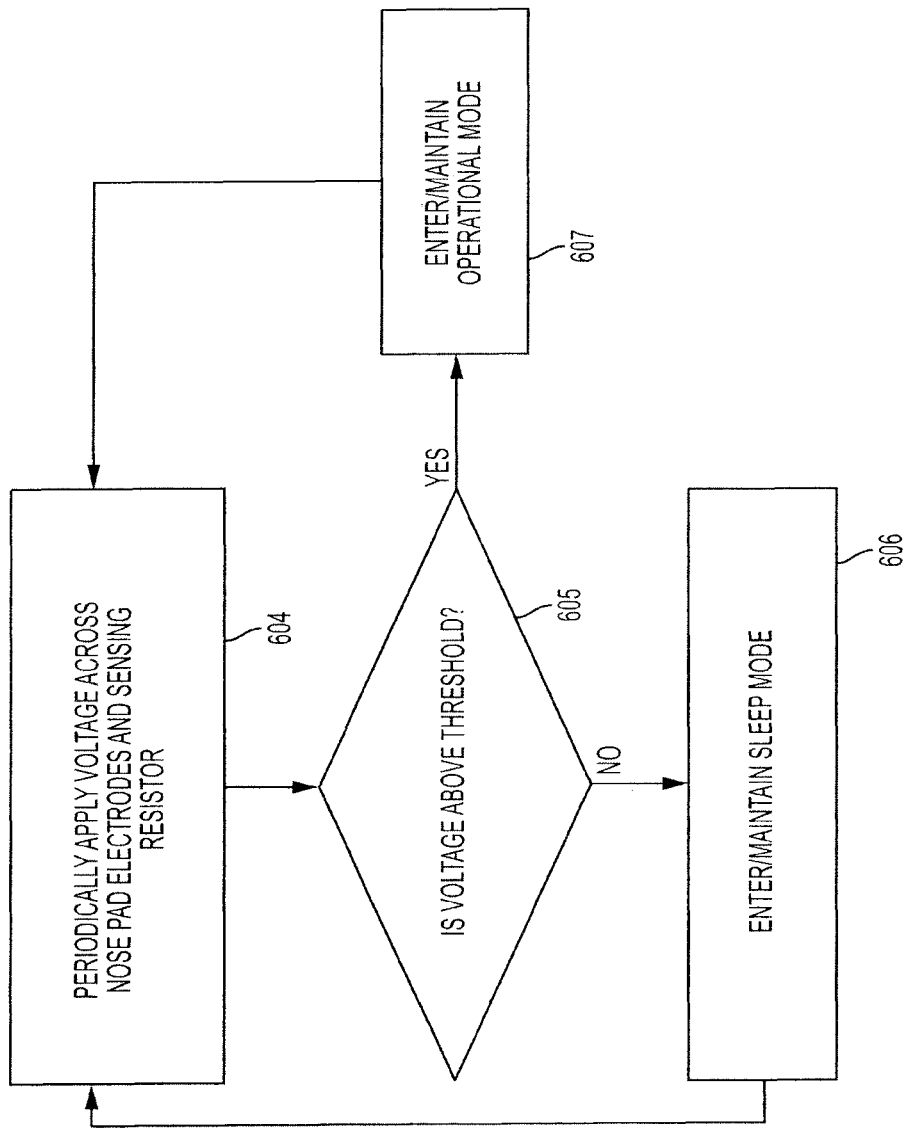
FIG. 6B is a flowchart showing an example of the operation of eyewear using resistive probes.

In a second example, FIG. 6B depicts a flowchart of the operation of eyewear 12 using resistive probes 114 to detect if the eyewear is being worn by the user. In step 604, controller 100 periodically applies a voltage across resistive probes 114 and measures the voltage across a sensing resistor (not shown) wired in series with resistive probes 114. Then, in step 605, controller 100 compares the measured voltage to a threshold. The threshold may be set at a value based on the expected voltage division between the sensing resistor and the resistance of a user's nose (i.e., the sensing resistor and the resistance of a user's nose are a series circuit). If the voltage across the sensing resistor is not above the threshold, controller 100 determines that there is an open circuit between resistive probes 114 due to the absence of the user's nose (i.e., no current is flowing between the resistive probes). Thus, controller 100 enters or maintains a sleep mode in step 606. If, however, the voltage across the sensing resistor is above the threshold, controller 100 determines that there is a closed circuit between resistive probes 114 due to contact with the user's nose (i.e., current is flowing between the resistive probes). Thus, controller 100 enters or maintains a normal operational mode in step 607.

Figure 6C:
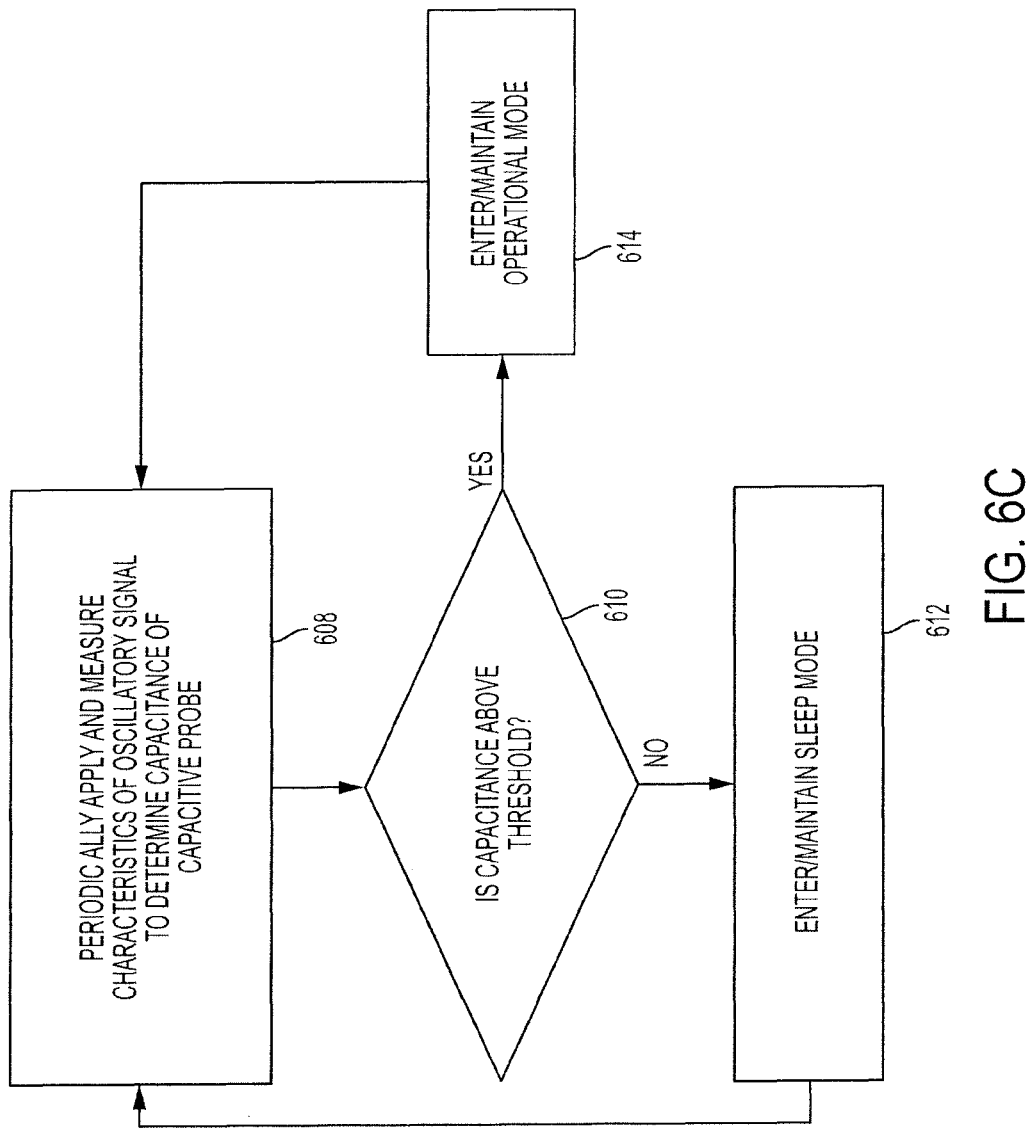
FIG. 6C is a flowchart showing an example of the operation of the eyewear using capacitive probes.

In a third example, FIG. 6C depicts a flowchart of the operation of eyewear 12 using a capacitive probe 116 to detect if the eyewear is being worn by the user. In step 608 controller 100 periodically applies an oscillating voltage across capacitive electrodes of capacitive probe 116 and measures the frequency of the oscillating voltage or the charge time of the capacitor which corresponds to the capacitance of the probe. Then in step 610, controller 100 compares the measured value to a threshold. The threshold may be set at a frequency and/or time value based on the expected frequency of the oscillating voltage or time of charge due to the presence of a user's nose. If the frequency of the oscillating voltage or the charge time is not above the threshold, controller 100 determines that the capacitance of capacitive probe is not altered due to the absence of the user's nose (i.e., the capacitance is due to the probes). Thus, controller 100 enters or maintains a sleep mode in step 612. If, however, the frequency of the oscillating voltage or the charge time of the capacitor is above the threshold, controller 100 determines that the capacitance of capacitive probe has been altered (increased) due to the presence of the user's nose in the region defined by the support structure (i.e., the capacitance increase is due to the combination of the probes and the user's nose). Thus, controller 100 enters or maintains a normal operational mode in step 614.

Figure 6D:
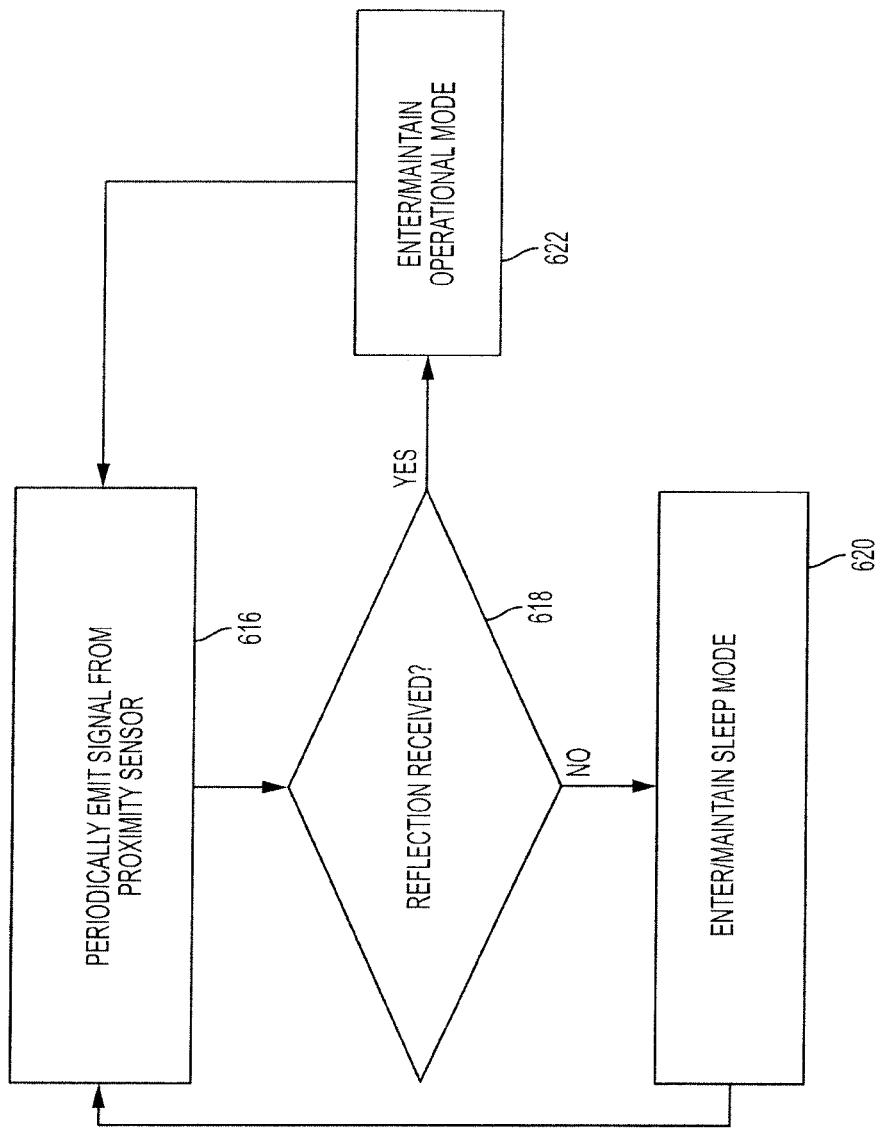
FIG. 6D is a flowchart showing an example of the operation of the eyewear using a proximity sensor.

In a fourth example, FIG. 6D depicts a flowchart of the operation of eyewear 12 using a proximity sensor 118 to detect if the eyewear is being worn by the user. In step 616, controller 100 periodically controls proximity sensor 118 to transmit an IR signal. Then in step 618, controller 100 determines when proximity sensor 118 receives a reflection of the IR signal. If a reflection is not received, controller 100 determines that the lack of reflection is due to the absence of the user's head (e.g., nose) in the region defined by the support structure for receiving the head of the user. Thus, controller 100 enters or maintains a sleep mode in step 620. If, however, a reflection is received, controller 100 determines that the reflection is due to the presence of the user's head (e.g., nose). Thus, controller 100 enters or maintains a normal operational mode in step 622.

Figure 6E:
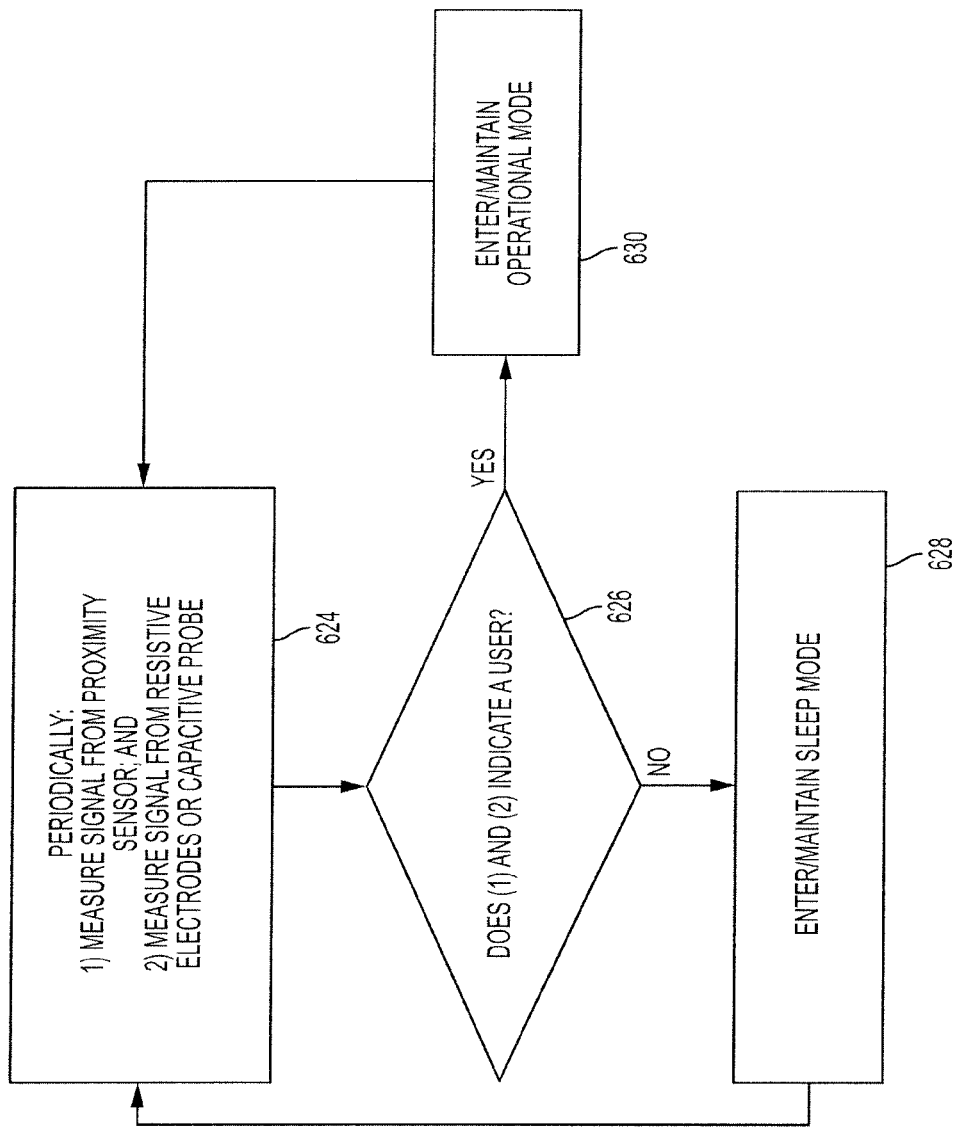
FIG. 6E is a flowchart showing an example of the operation of the eyewear using a proximity sensor in conjunction with capacitive/resistive probes.

In a fifth example, FIG. 6E depicts a flowchart of the operation of eyewear 12 using a proximity sensor 118 in conjunction with resistive probes 114 or capacitive probe 116 to detect if the eyewear is being worn by the user. In step 624 controller 100 periodically controls proximity sensor 118 to transmit an IR signal, and periodically applies an oscillating voltage across capacitive electrodes of capacitive probe 116 and measures the frequency of the oscillating voltage or charge time of the probe which corresponds to the capacitance of the probe. Then in step 626, controller 100 determines if a reflection of the IR signal is received by proximity sensor 118 and compares the measured frequency of the oscillating voltage or the charge time to a threshold. If the reflection is received and the frequency or charge time is above the threshold, controller 100 determines that a user is wearing the eyewear and enters or maintains a normal operational mode in step 630. If, however, the reflection is not received and/or the frequency or charge time is not above the threshold, controller determines that the user is not wearing the eyewear and enters or maintains a sleep mode in step 628.

The steps in FIGS. 6A-6E may be performed by the controller 100 of the electronic components upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller described herein, such as the steps in FIGS. 6A-6E, may be implemented in software code or instructions which are tangibly stored on a tangible computer readable medium.

Upon loading and executing such software code or instructions by the controller, the controller may perform any of the functionality of the controller described herein, including the steps in FIGS. 6A-6E described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. Eyewear comprising:
an optical element;
electronic components including a sensor that senses physical activity related to the eyewear and a controller, the electronic components having a first mode of operation, a second mode of operation, and a third mode of operation;
a support structure configured to support the optical element and the electronic components, the support structure defining a region for receiving at least a portion of a head of a user; and
a use detector electrically connected to the electronic components and attached to the support structure and positioned to sense when the at least the portion of the head of the user is within the region,
wherein the controller monitors the use detector and transitions from the first mode of operation to the second mode of operation when the use detector senses that the at least the portion of the head of the user is within the region and monitors the sensor and transitions from the third mode of operation to the first mode of operation when the physical activity is sensed by the sensor.

2. The eyewear of claim 1, further comprising a nose pad, the use detector comprising a flexible printed circuit board (FPCB) connecting the use detector to the electronic components, a second sensor mounted on the FPCB, and a third sensor mounted on the FPCB, at least one of the second sensor or the third sensor being located within the nose pad or covered by the nose pad and embedded into the support structure.

3. The eyewear of claim 2, wherein the FPCB extends from the electronic components to the use detector through the support structure.

4. The eyewear of claim 1, wherein the support structure comprises:
a frame; and
temples connected to the frame, at least one of the frame or the temples defining the region for receiving the at least the portion of the head of the user.

5. The eyewear of claim 4, wherein the sensor is embedded in at least one of the temples connected to the frame and is electrically connected to the electronic components and supported by the support structure, the sensor being attached to the support structure and positioned to detect when the at least the portion of the head of the user is within the region,
wherein the controller transitions from the first mode of operation to the second mode of operation when both the use detector and the sensor detect that the at least the portion of the head of the user is within the region.

6. The eyewear of claim 1, wherein the use detector comprises at least one of a capacitive probe, a resistive probe, or a proximity sensor.

7. The eyewear of claim 1, wherein the electronic components are configured to periodically apply an oscillatory electrical signal to the use detector and monitor the applied oscillatory electrical signal to determine when the at least the portion of the head of the user is within the region.

8. The eyewear of claim 2, wherein the controller is configured to apply a voltage between the second and third sensors and to determine when the at least the portion of the head of the user is within the region when a sensing voltage between the second and third sensors is below a threshold value.

9. The eyewear of claim 2, wherein the second sensor comprises a first capacitive electrode mounted on the FPCB, and the third sensor comprises a second capacitive electrode mounted on the FPCB, the second sensor, the third sensor, and the FPCB forming a capacitive probe supported by the support structure, and the controller is configured to apply an oscillating signal, monitor an amplitude of the oscillating signal, and determine when the at least the portion of the head of the user is within the region when the monitored amplitude is below a threshold value.

10. The eyewear of claim 5, wherein the sensor comprises:
a proximity sensor embedded in the at least one of the temples, the proximity sensor configured to transmit a signal, receive a reflection of the signal when the at least the portion of the head of the user is within the region, and produce a value corresponding to the received reflection, wherein the controller is configured to instruct the proximity sensor to transmit the signal, interpret the value corresponding to the received reflection, and determine when the at least the portion of the head of the user is within the region when the interpreted value is within a predefined range.

11. The eyewear of claim 10, wherein the proximity sensor is an infrared (IR) transceiver that transmits an IR signal and receives a reflection of the IR signal when the at least the portion of the head of the user is within the region.

12. The eyewear of claim 1, wherein when the electronic components are in the first mode of operation the electronic components have a first power consumption level, when the electronic components are in the second mode of operation the electronic components have a second power consumption level that is higher than the first power consumption level, and when the electronic components are in the third mode of operation the electronic components have a third power consumption level that is lower than the first power consumption level.

13. An eyewear control method comprising:
monitoring, with a use detector, a region defined by a support structure of eyewear, the region for receiving at least a portion of a head of a user of the eyewear;
transitioning electronic components of the eyewear from a first mode of operation to a second mode of operation when the at least the portion of the head of the user is detected within the region;
sensing, with a sensor, physical activity related to the eyewear; and
transitioning the electronic components from a third mode of operation to the first mode of operation when a physical activity is sensed.

14. The method of claim 13, wherein the sensor is embedded in at least one temple connected to a frame of the eyewear and is electrically connected to the electronic components and supported by the frame, the sensor being positioned to detect when the at least the portion of the head of the user is within the region, wherein transitioning the electronic components from the first mode of operation to the second mode of operation comprises transitioning a controller of the electronic components from the first mode of operation to the second mode of operation when both the use detector and the sensor detect that the at least the portion of the head of the user is within the region.

15. The method of claim 14, wherein the use detector comprises a flexible printed circuit board (FPCB) connecting the use detector to the electronic components, a second sensor mounted on the FPCB, and a third sensor mounted on the FPCB, at least one of the second sensor or the third sensor being embedded into the frame of the eyewear, wherein the second sensor comprises a first capacitive electrode mounted on the FPCB, and the third sensor comprises a second capacitive electrode mounted on the FPCB, the second sensor, the third sensor, and the FPCB forming a capacitive probe, and wherein the monitoring comprises:
applying an oscillating signal to the capacitive probe; and
sensing an amplitude of the oscillating signal, the sensed amplitude indicative of whether the at least the portion of the head of the user is in the region.

16. The method of claim 13, wherein the first mode of operation has a power consumption level that is lower than the second mode of operation and higher than the third mode of operation.

17. A non-transitory computer-readable medium storing program code for controlling eyewear, wherein the program code, when executed, is operative to cause an electronic processor to perform the steps of:
monitoring, with a use detector, a region defined by a support structure of eyewear, the region for receiving at least a portion of a head of a user of the eyewear;
transitioning electronic components of the eyewear from a first mode of operation to a second mode of operation when the at least the portion of the head of the user is detected within the region;
sensing, with a sensor, physical activity related to the eyewear; and
transitioning the electronic components from a third mode of operation to the first mode of operation when a physical activity is sensed.

18. The non-transitory computer-readable medium storing the program code of claim 17, wherein the sensor is embedded in at least one temple connected to a frame of the eyewear and is electrically connected to the electronic components and supported by the frame, the sensor being positioned to detect when the at least the portion of the head of the user is within the region, wherein transitioning the electronic components from the first mode of operation to the second mode of operation comprises transitioning a controller of the electronic components from the first mode of operation to the second mode of operation when both the use detector and the sensor detect that the at least the portion of the head of the user is within the region.

19. The non-transitory computer-readable medium storing the program code of claim 18, wherein the use detector comprises a flexible printed circuit board (FPCB) connecting the use detector to the electronic components, a second sensor mounted on the FPCB, and a third sensor mounted on the FPCB, at least one of the second sensor or the third sensor being embedded into the frame of the eyewear, wherein the second sensor comprises a first capacitive electrode mounted on the FPCB, and the third sensor comprises a second capacitive electrode mounted on the FPCB, the second sensor, the third sensor, and the FPCB forming a capacitive probe, and wherein the monitoring comprises:
applying an oscillating signal to the capacitive probe; and
sensing an amplitude of the oscillating signal, the sensed amplitude indicative of whether the at least the portion of the head of the user is in the region.

20. The non-transitory computer-readable medium storing the program code of claim 17, wherein the first mode of operation has a power consumption level that is lower than the second mode of operation and higher than the third mode of operation.

* * * * *